INVENTORS
George S. Bowman
BY Norman P. Erkel Jr.
Attorney

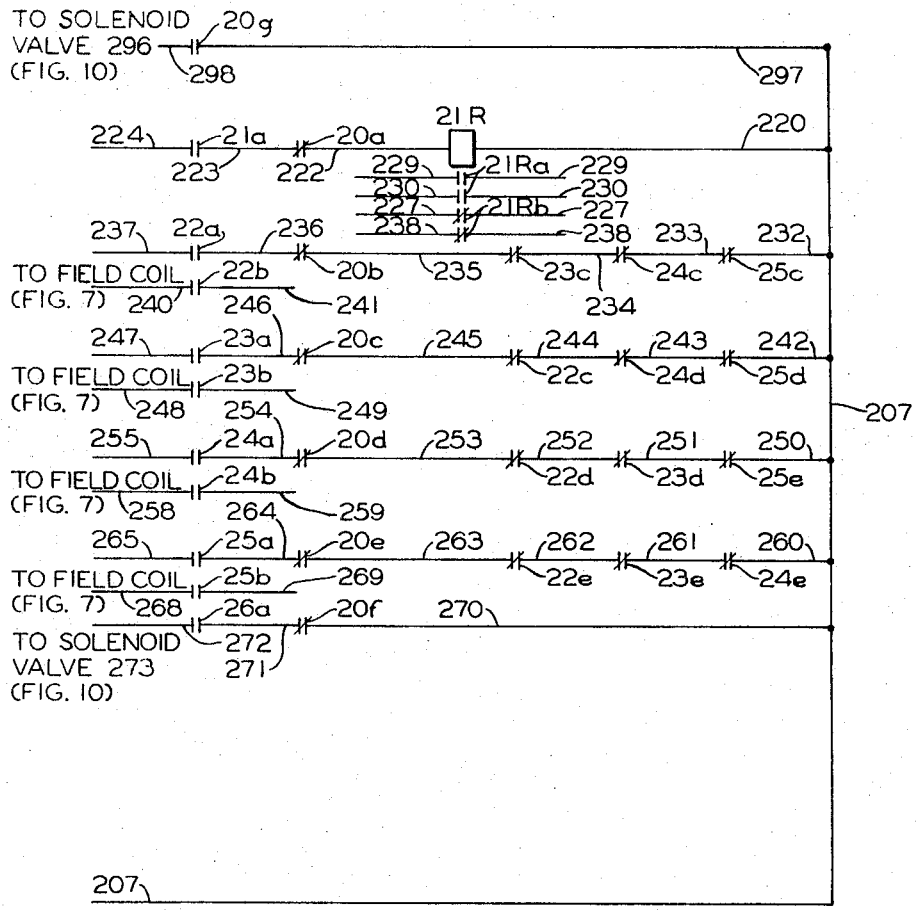
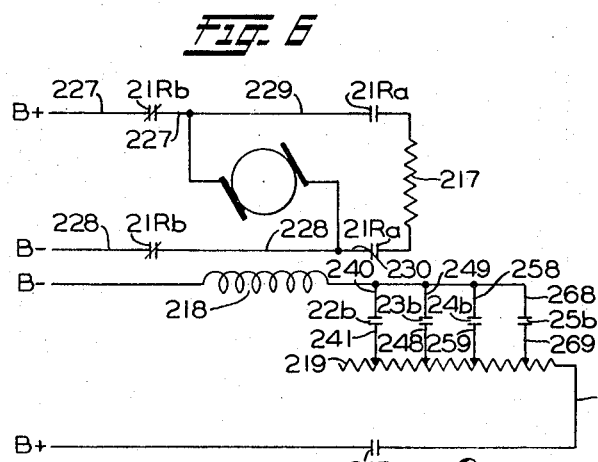
Fig. 6
Fig. 7
INVENTOR.
George S. Bowman
BY Norman P. Erkel Jr.
Attorney

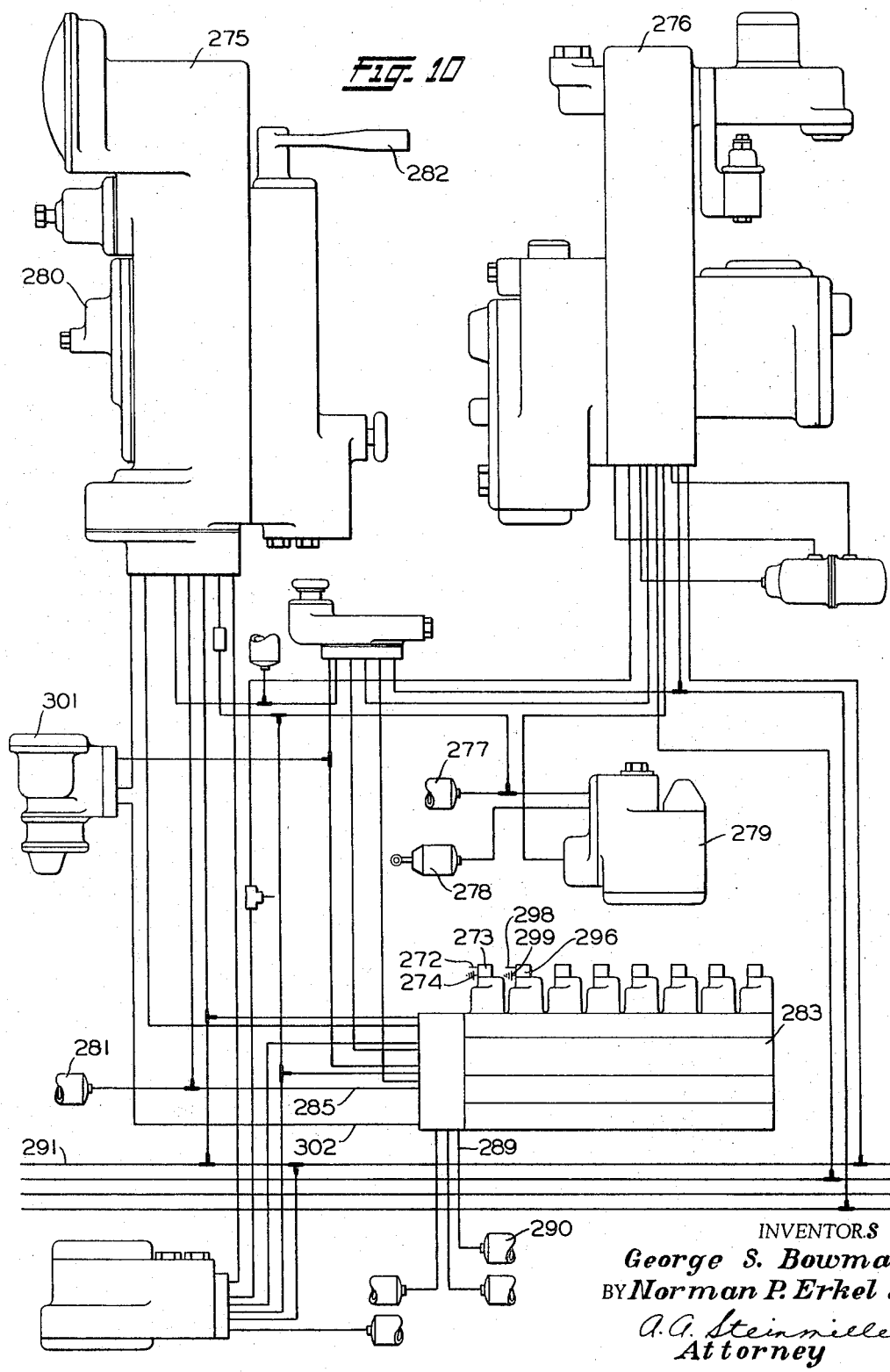

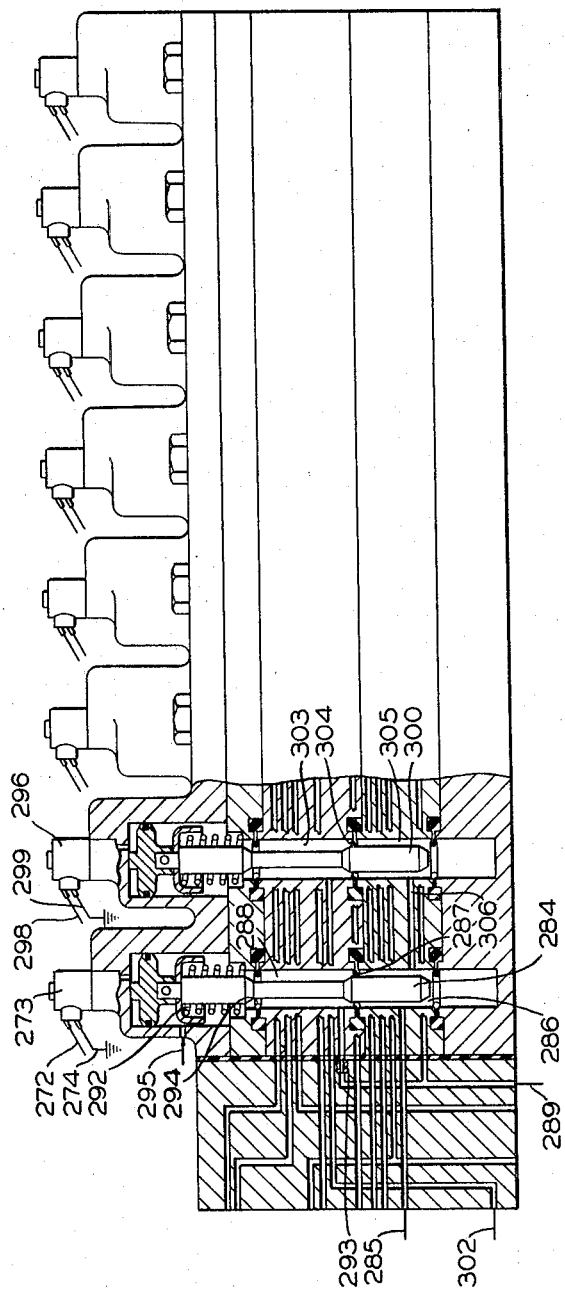

United States Patent Office 3,300,639
Patented Jan. 24, 1967

3,300,639
BRAKE AND PROPULSION CONTROL SYSTEM
FOR AUTOMATED TRAINS
George S. Bowman, Pittsburgh, and Norman P. Erkel, Jr.,
Carnegie, Pa., assignors to Westinghouse Air Brake
Company, Wilmerding, Pa.
Filed Aug. 23, 1963, Ser. No. 304,068
12 Claims. (Cl. 246—182)

This invention relates to automatic propulsion and brake control systems for unmanned trains and, more particularly, to an automatic speed measuring and controlling means for accurately measuring the speed of the train and accordingly providing effective control of the train brakes and/or propulsion equipment as a result of the speed measurement to thereby maintain the train speed within limits as necessitated by track grade, curvatures, and stopping requirements.

In automatic unmanned train systems, it is necessary to have a constant knowledge of the exact speed of the train in order to maintain a constant control of the train braking and propoulsion equipment to keep the train speed within limits set by track conditions as indicated by way-side signal systems.

According to the present invention, there is provided a new and improved automatic speed measuring and controlling system utilizing long life and low cost transistorized circuitry for rapidly and accurately measuring the exact speed of an automatic unmanned train and accordingly controlling the braking and propulsion equipment to regulate the train speed within predetermined limits as required by track conditions. More particularly, the invention provides an automatic propulsion and brake control for an unmanned train and includes a plurality of zoning means contactors, a signal pick-up means operative responsively to signals transmitted from the trackway to selectively condition said zoning means contactors, and a pulsating voltage means providing a voltage pulsating at a frequency proportional to the speed of the train, said voltage being supplied via certain of said zoning means contactors for a time interval determined by a timing means operative cooperatively therewith, to a pulsation counting and registering means which, in turn, sets up predetermined logic circuitry in accordance with the pulsation count and the conditioning of certain other of said zoning means contactors to selectively control propulsion and brake control means for variously regulating the speed of the train according to the track zone.

Figure 1:
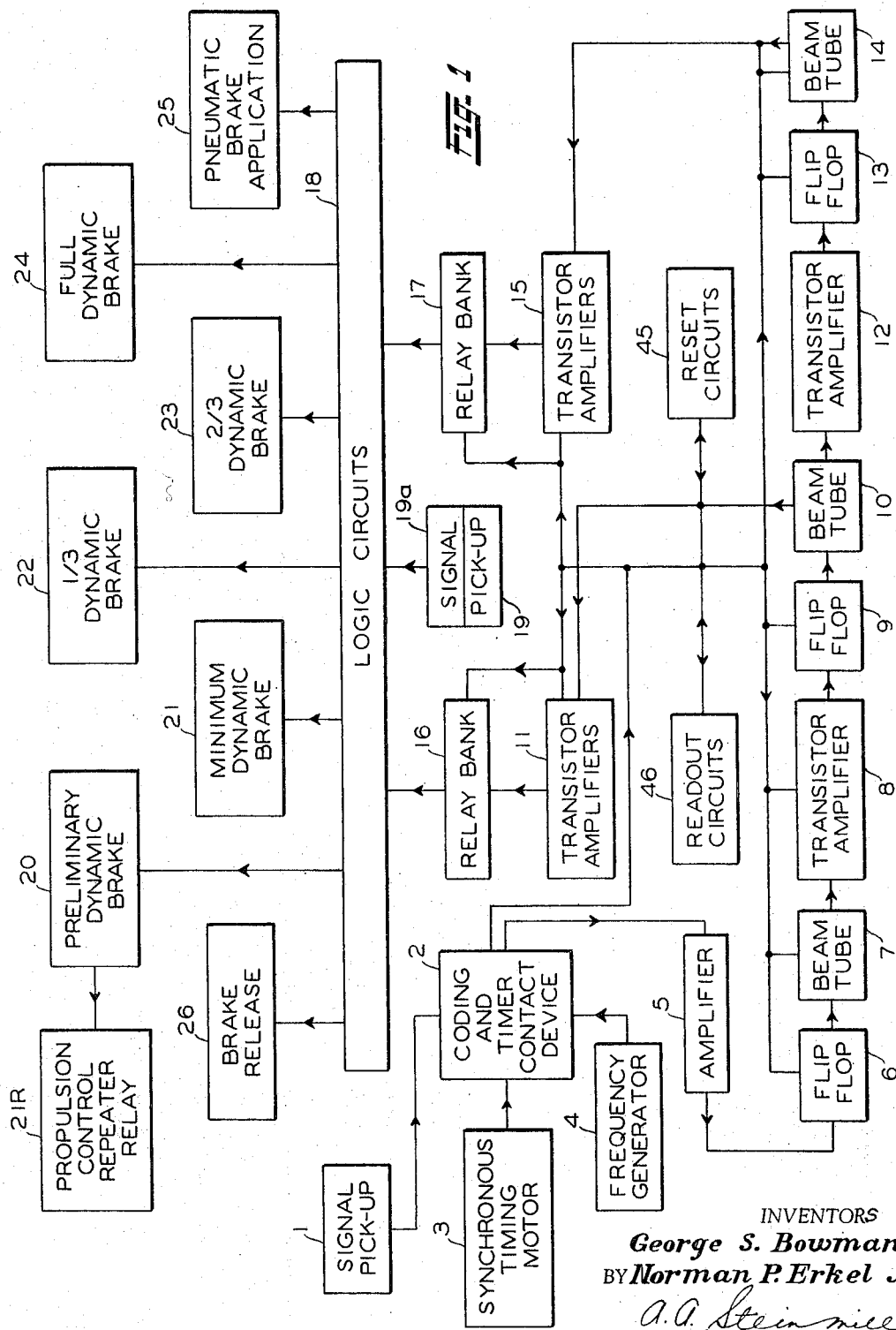
Figure 2:
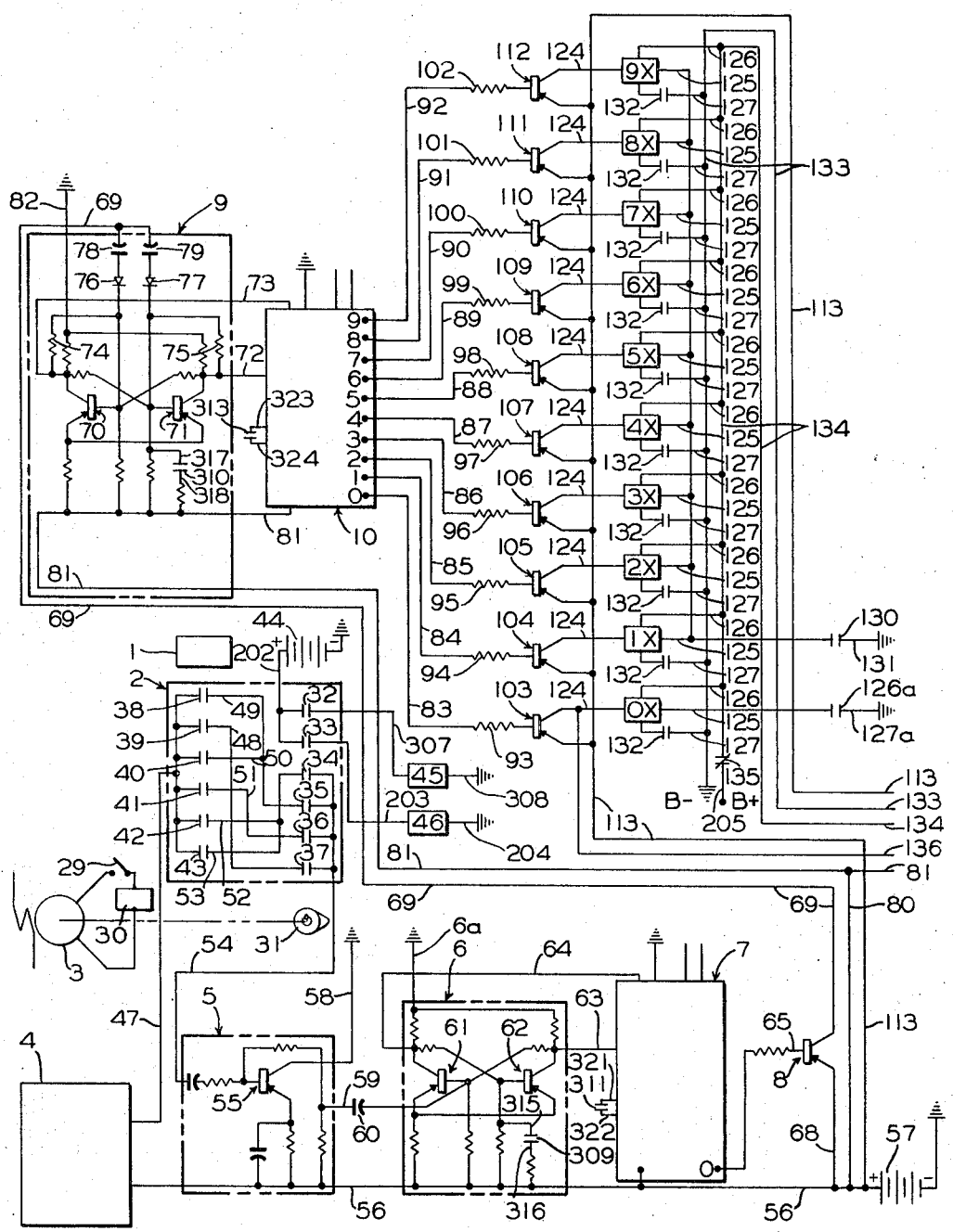
Figure 3:
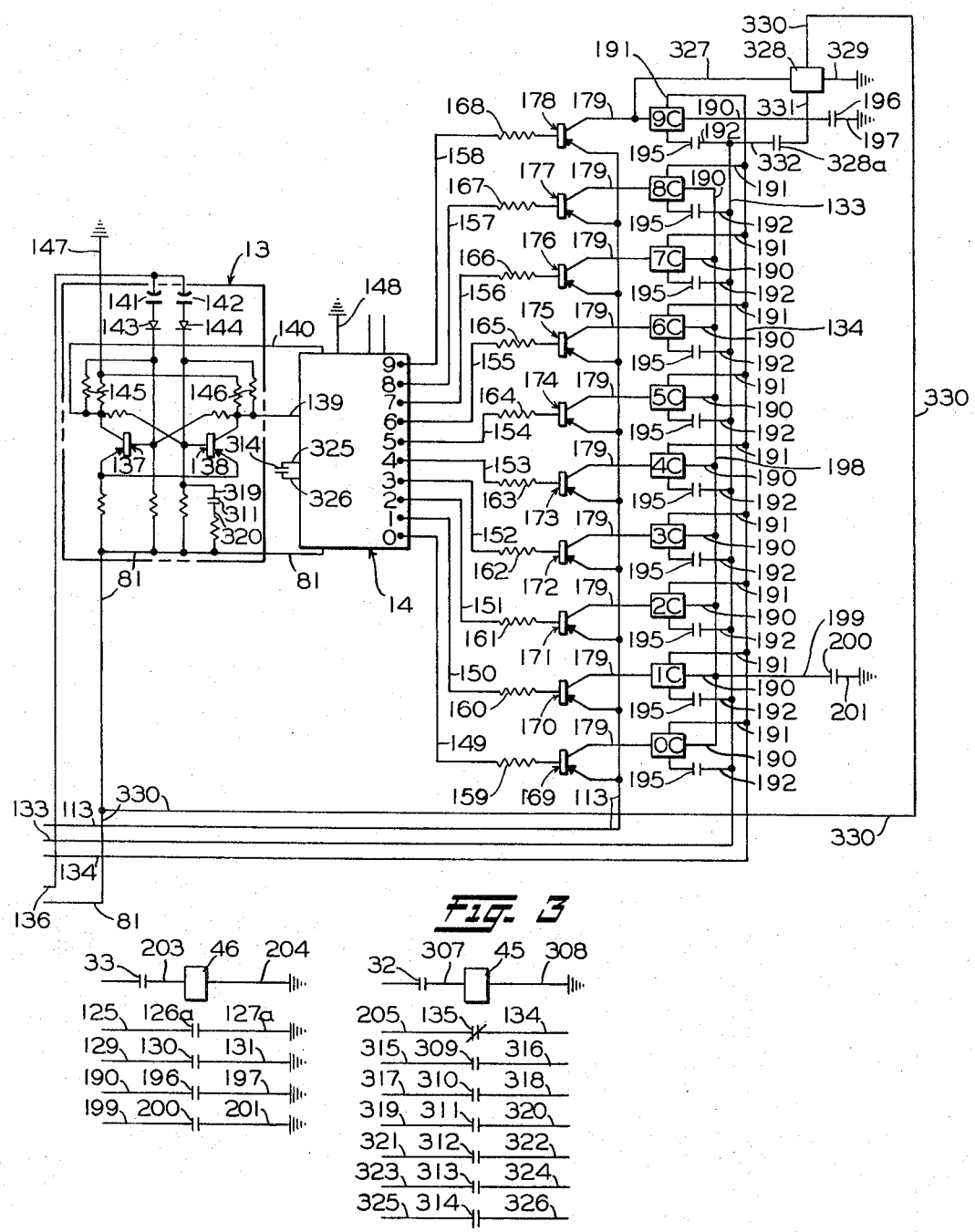

In the accompanying drawings, FIG. 1 shows a block diagram of the different basic component elements and devices utilized in the automatic speed measuring and control device and the interconnectability therebetween to effect the braking and propulsion control desired as a result of speed measurements. FIGS. 2, 3, when taken together, and 4, 5, when taken together, respectively show a diagrammatic view of speed measuring and controlling apparatus with the necessary counting and logic circuitry and details of the interconnected component elements. FIG. 6 shows the circuitry controlled by the logic circuits. FIG. 7 shows the basic dynamic braking and propulsion motor circuitry. FIGS. 8 and 9 show the circuitry operated by the readout and reset relays of the equipment. FIG. 10 shows the basic pneumatic braking equipment, and FIG. 11 shows a detailed portion of said pneumatic equipment.

Basic description—FIG. 1

As shown in FIG. 1, the automatic speed measuring and controlling means includes a wayside signal pick-up device 1 of any well-known design for receiving coded trackside signals for selectively closing certain coding contacts (explained hereinafter) of a timer device 2 in accordance with track grade, curvatures, and stopping requirements to selectively effect propulsion and braking conditions as desired, as explained hereinafter. A timer motor 3 is associated with the timer device 2 to sequentially close a plurality of timer contacts for predetermined periods of time (explained hereinafter), for cooperatively operating with the aforesaid coding contacts to select the braking and propulsion requirements in accordance with the instant speed and the track requirements as discussed hereinafter.

Operating in cooperation with the timer motor 3 is a frequency generator 4 of a well-known type, such as one having an axle driven rotating notched wheel with teeth that pass under magnetic pickup to induce an alternating current in the pickup each time a tooth passes under the pickup at a frequency corresponding to the speed of the train. The alternating current supplied from the aforesaid pickup of the frequency generator 4 at a frequency corresponding to train speed is supplied to the timer device 2 and thereby under the control of the coding contact specified by wayside signal and the timer contact for a predetermined time interval (explained hereinafter), to an input amplifier 5 where the input signal current is amplified and clipped to a particular level such that the amplifier gain remains relatively constant and then supplied (by capacity coupling) to a second amplifier 6 of the transistorized flip-flop type. This flip-flop amplifier 6 includes a plurality of transistors and circuitry (explained hereinafter) operative on each half cycle of input current to effect an impulse of supply therefrom to a beam tube 7 and associated circuitry at twice the frequency of the input to the flip-flop amplifier 6.

The beam tube 7 is a well-known vacuum tube device connected by switching circuitry, the details of which are not necessary to an understanding of the present invention. If necessary, further details may be obtained from a study of the circuitry of the Burroughs Corporation beam switching tube Model 6701. Basically, the beam tube comprises one cathode and ten plates with the plates acting as targets for an operation as a ten position counter having five so-called odd plates operative in a succession responsively to half the impulses received from the flip-flop amplifier 6 when one transistor therein is conducting as explained hereinafter, and the other five so-called even plates operative alternately with the odd plates in succession responsively to the remaining half of impulses received from the flip-flop amplifier 6 when another transistor is conducting as explained hereinafter. In operation, the plates of the beam tube 7 are activated to supply an impulse of current from each of the plates in an order such that first, an odd plate supplies, and then an even, and so on in succession through each of the plates from the zero plate to the ninth plate, and then the order is repeated. Only the impulse from the zero plate of beam tube 7 is utilized, thus each five cycles of current impulse supplied by the frequency generator 4 is doubled into ten impulses by the flip-flop amplifier 6 and then supplied progressively to the ten plates of the beam tube 7 where only the impulse of the zero plate is utilized (thus every tenth impulse) by being supplied to a transistor amplifier 8 where it operates said amplifier to transmit a single impulse signal to a second flip-flop amplifier 9.

The impulse or signal supplied to the second flip-flop amplifier 9 is fed through a plurality of transistors and associated circuitry therein, explained hereinafter, to cause a single impulse signal to be supplied alternately to the respective odd or even grids of a second beam tube 10 such that the ten plates thereof are energized progressively one at a time each time the impulse or signal from the zero plate of the first beam tube 7 transmits its aforesaid signal. Each plate of the second beam tube 10 is connected to an individual associated transistor amplifier, shown in FIG. 1 as one amplifier 11 in block form, however, there are actually a plurality of individual amplifiers, as will be explained in connection with FIGS. 2 and 3.

Each time the zero plate of the second beam tube 10 is energized the signal supplied thereby is supplied to a transistor amplifier 12 which, in turn, operates to transmit a signal pulse to a third flip-flop amplifier 13 at a frequency corresponding to the frequency of energization of said zero plate of said second beam tube 10. The third flip-flop amplifier 13 operates in response to this supplied signal pulse such that the transistors, shown in FIG. 3, therein will alternately conduct each time a signal pulse is supplied thereto to thus supply alternately a current impulse to the odd and even plates of a third beam tube 14 in succession at a frequency corresponding to the input signal pulse to the flip-flop amplifier 13 which, in turn, corresponds to each time the zero plate of beam tube 10 was energized. A plurality of transistor amplifiers, shown in FIG. 3, represented herein in FIG. 1 by a single block 15 are connected respectively to each plate of the beam tube 14.

It can thus be seen that by energizing the ten plates of the beam tube 7 one at a time in accordance with an input signal of speed determined frequency supplied thereto by the frequency generator 4 for a time interval determined by the coding contacts and timing contacts of the timing device 2, the beam tube 7 becomes a unit counter; and by energizing the beam tube 10 one plate at a time in accordance with the frequency at which the zero plate of the beam tube 7 was energized (every tenth cycle), the beam tube 10 becomes a decade or ten counter; and by energizing the beam tube 14 one plate at a time in accordance with the frequency at which the zero plate of the beam tube 10 was energized (every tenth cycle), the beam tube 14 becomes a hundred counter.

It should be noted herein that, if desired, still another circuitry including a flip-flop amplifier and a beam tube could be set in operation by a signal instigated by the zero plate of the beam tube 14 to become a thousand counter in a manner similar to that described with the tens and hundreds counters, however, such a possible circuitry is not necessary and therefore is not shown herein.

The output signal of the unit counter beam tube 7 is utilized to initiate and regulate the operation of the tens and hundreds counter beam tubes 10 and 14 in accordance with the train speed. The output signals of the tens and hundreds counter beam tubes 10 and 14 are supplied to their respective amplifier circuitry (shown in FIG. 1 as amplifier blocks 11 and 15) which, in turn, selectively control operation of banks of relays shown in block form as 16 and 17 in FIG. 1 and in detail in later discussed drawings (FIGS. 2 and 3).

Operation of the relay banks 16 and 17 (as controlled by the count indicated by the beam tubes 10 and 14 to indicate vehicle speed) controls contacts (not shown in FIG. 1 but in FIGS. 2 and 3) to selectively energize logic circuitry (discussed hereinafter) on the locomotive, shown in block form in FIG. 1 as 18.

Figure 4:
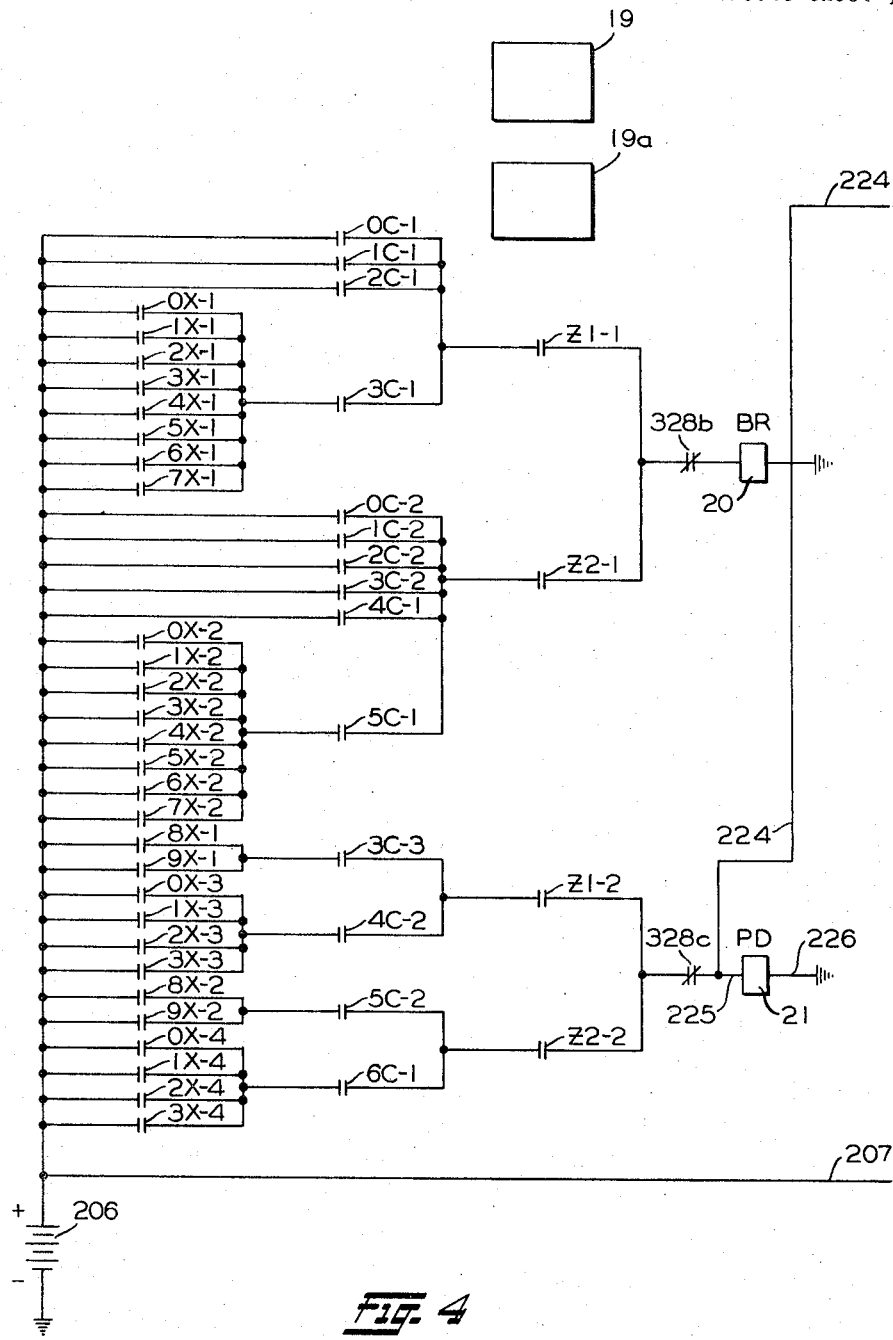
Figure 5:
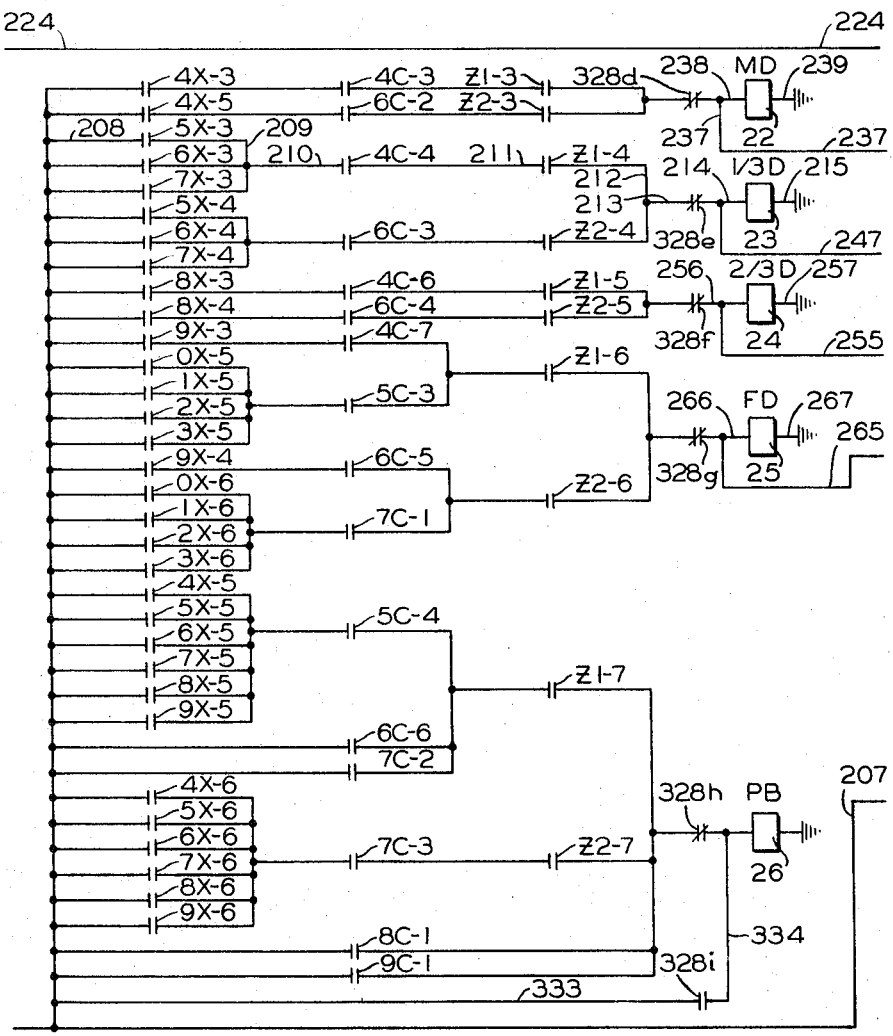

The logic circuits 18 include contact members (shown in FIGS. 4 and 5) which, in turn, are controlled by zone relays, shown in block form as 19 and 19a, which are operative responsive to wayside signals in certain speed zones to result in selective control of a particular one of a plurality of braking and propulsion control relays, shown in FIG. 1 as braking control relays 20, 21, 22, 23, 24, 25 and 26 and propulsion control repeater relay 21R to control the propulsion and the braking of the train in accordance with the selected actual speed circuitry and the desired wayside circuitry in the logic circuitry 18.

*Operation*

In order to obtain a detailed understanding of the present invention, it is necessary to assume one speed requirement with one speed condition and trace the circuitry utilized in the operation resulting therefrom.

To start the equipment in operation, a switch 29 (FIG. 2) is closed to connect the timer motor 3 to a suitable source 30 of alternating current, such as 110 alternating current, to thereby start the synchronous timer motor 3 rotating at a constant predetermined speed. With the timer motor 3 operating, a plurality of cams represented herein as a single cam 31 are operated to determine the sequence and the length of time that a plurality of timer contacts 32, 33, 34, 35, 36 and 37 are open and closed. It should be noted herein that for simplicity of reading, all open contacts or contact members are shown in the drawings as two parallel lines $$(\dashv \vdash)$$

in the circuitry with an oblique line through them to indicate that they are normally closed $$(\dashv\!\!\!/\!\vdash)$$

These timer contacts in the timing device 2 are included in circuitry also including a plurality of track zone coding contacts 38, 39, 40, 41, 42 and 43 which are closed selectively by suitable wayside track zone signaling means shown in FIGS. 1 and 2 as a block 1.

The timer driven cams 31 are arranged in a predetermined order (not shown) such that the timer contacts 32 through 37 are opened and closed for prescribed time intervals to provide the hereinafter described necessary timed phases of operation in the prescribed rapid sequence of operation which are:

(a) speed *count*,
(b) readout to apply the circuitry set up during speed count to the logic circuits which have been set by track requirements, and
(c) *reset* to recondition all the circuitry for another cycle of operation.

Thus, closing of timer contact 32 at the prescribed time by a cam 31 will complete circuitry from a suitable source of supply 44 indicated in FIG. 2 by a battery to energize a reset relay 45, the contacts and operation of which are explained in detail hereinafter with respect to FIG. 9, to recondition all the circuitry in a manner described hereinafter.

Closing of timer contact 33 at a prescribed time by cam means 31 completes circuitry from supply 44 to energize a readout relay 46, the contacts and operation of which are explained in detail hereinafter with respect to FIG. 8, to effect a readout of the counter circuitry through the logic circuitry in a manner described hereinafter.

The timer contacts 34, 35, 36 and 37 are closed selectively by the wayside signal relay device 1 such that each different periods of time such that the current pulses supplied from the zone contacts 38 to 42 will be counted for selected lengths of time in accordance with the particular zone contact closed, in a manner more fully described hereinafter.

The zone coding contacts 38 to 42 are closed selectively by the wayside signal relay device 1 such that each coding contact is closed at different speed zone requirements, as for example herein, contact 38 is closed when the speed requirement is 35 m.p.h., contact 39 for 30 m.p.h., contact 40 for 25 m.p.h., contact 41 for 20 m.p.h. contact 42 for 15 m.p.h., and contact 43 for 10 m.p.h.

Assuming now that the switch 29 has been closed and the train is moving in a track speed zone, the frequency generator 4 will supply alernating current impulses at a frequency directly proportional to the speed of the train. This alternating current impulse is supplied via wire 47 to the timer device 2 where only one of the coding contacts, say for example, contact 39 (30 m.p.h. requirement contact), is in its closed position as controlled by the wayside relay device 1. The frequency of the alternating current impulse at 30 m.p.h. has been predetermined to be a specific rate in a specific short instance of time, said instant of time in this case being measured by the interval of time at which the cams 31 have the timer contact 37 closed, said timer contact being the only one of the timer contacts connected to the 30 m.p.h. coding contact 39. Therefore, the actual speed count of alternating current impulses supplied by the frequency generator 4 at the specific instant are selectively supplied by a wier 48 to the connected specific timing contact 37 which is closed only for a specific predetermined time interval such that the measure of impulses is taken over a predetermined measured time. Thus, each speed zone will have a specific coding contact and timing contact included in the timing device. The wires 49, 50, 51, 52 and 53 connect the coding contacts 38, 40, 41, 42 and 43 to their respective predetermined timing contacts 34, 35 and 36 such that at the speed requirements that said selected coding contacts are closed, the timing is respectively altered by the use of the correct selected timing contact. It should be noted that two of the timing contacts 34 and 35 are utilized with two coding contacts each, however, the frequencies of the alternating current impulse supplied by the coding contacts differ enough that a different measured impulse results, thereby permitting the use of a single timing contact for more than one coding contact.

The alternating current impulse supplied by the timing device 2 must now be counted and electrically registerd in the following manner. The alternating current impulse is supplied from the timing device 2 by a wire 54 to the amplifier 5.

The amplifier 5 is a well-known input amplifier utilizing a transistor 55 powered by circuitry from a positive or B+ wire 56 (from a battery 57) and a ground wire 58 and utilizing the usual resistances and capacitance in manner well known and therefore not detailed herein. The amplifier 5 is utilized to amplify and clip the alternating current impulse input at wire 54 and supply said amplified alternating current signal via a wire 59 and a capacitance coupler 60 to a flip-flop amplifier 6.

The flip-flop amplifier 6 includes two transistors 61 and 62 powered from the B+ wire 56 and thence through well-known flip-flop circuitry including the usual resistances to a ground wire 6a The input signal supplied to the flip-flop amplifier 6 at wire 59 will cause the transistors 61 and 62 thereof to operate and conduct alternately on each half cycle of the input signal. Thus, transistor 61 will conduct to effect a signal supply to wire 63 on one half or the positive portion of each cycle of the input signal, and transistor 62 will conduct to effect a signal supply to wire 64 on the other half or the negative portion of each cycle of the input signal, to in effect, double the frequency of the input signal and then supply the new signal to the first beam tube 7 alternately by way of the two wires 63 and 64. The wire 63 is connected to the beam tube 7 internally (by means not necessary to an understanding of this invention and therefore not shown) to the even grids (not shown) of the beam tube, and, similarly, the wire 64 is connected to the odd grids (not shown) of the beam tube 7 in a manner such that the ten grids of said tube (not shown, but identified by indicator numerals 0 through 9) are energized progressively from zero through nine, to in turn, effect energization of the ten so-called internal targets progressively. Thus, it can be seen that the zero target is energized each five complete cycles of current supplied by the frequency generator 4.

In the beam tube 7, only the zero target (not shown) thereof is utilized by connection to an output wire 65 which, in turn, supplies the signal input to a transistor amplifier 8. The signal thus supplied by the wire 65 effects operation of the amplifier 8 (which is powered by connection to the B+ wire 56 by wire 68) to transmit an amplified positive potential signal pulse by wire 69 to the second flip-flop amplifier 9 at an impulse rate determined by the signal delivered by the beam tube 7. The second flip-flop amplifier 9 includes transistors 70 and 71 and the usual plurality of resistors (not described) connected in manner well known to provide flip-flop amplifier circuitry, such that when transistor 70 is conducting, a signal is transmitted by way of wire 72 to the even grids (not shown) of the second beam tube 10, and when the transistor 71 is conducting, a signal is transmitted by way of wire 73 to the old grids (not shown) of the second beam tube 10. In that signal supplied to the flip-flop amplifier 9 is not in a wave form, a so-called, well-known "steering circuit" comprising a plurality of resistors 74, 75, rectifiers 76, 77, and condensers 78 and 79 (not described, in that an understanding thereof is not essential to an understanding of the present invention) is included in the circuitry to permit the unipolar positive potential pulse signal supplied thereto to operate the flip-flop amplifier 9 in manner well known in flip-flop circuitary. The flip-flop amplifier 9 is powered by circuitry including a wire 80 from the B+ wire 56 and wire 81 to the amplifier 9 and thence through the internal circuitry thereof to the ground wire 82.

It can thus be seen that with each pulse supplied to the flip-flop amplifier 9, the operation thereof effects energization of one grid of the beam tube 10 (energized from B+ wire 56 by way of wires 80 and 81) to effect energization of one target thereof (not shown, but identified by indicator numerals 0 through 9) and each successive pulse supplied thereto causes the targets of the beam tube to energized successively one at a time in correspondence therewith. Each target 0 through 9 (not shown) of beam tube 10 is connected by a respective wire 83, 84, 85, 86, 87, 88, 89, 90, 91 and 92 through individual coupling resistors 93, 94, 95, 96, 97, 98, 99, 100, 101 and 102, respectively, to operate respective transistor amplifiers 103, 104, 105, 106, 107, 108, 109, 110, 111 and 112 successively one at a time. Each of the transistor amplifiers 103 through 112 are powered (responsive to receipt of the respective signal input) by a circuit including a wire 113 from the B+ wire 56 and thence to the respective amplifiers in parallel. Associated with each of the transistor amplifiers and operably energized when their respective amplifiers are conducting are a plurality of relays 0X, 1X, 2X, 3X, 4X, 5X, 6X, 7X, 8X and 9X for each respective amplifier 103 through 112. The relays 0X to 9X are identified as such in that the 0X relay is energized by the amplifier 103 responsively to energization of the 0 target of beam tube 10, relay 1X is energized responsively to energization of the number 1 target, 2X responsively to the number 2 target, etc., where the digit represents the target number effecting energization thereof, and the X indicates that the relay is effective as a counter of tens when energized, as explained hereinafter. The relays 0X through 9X are all identical and each is constructed with a preliminary pick-up winding, not shown but indicated by the lead wires 124 and 125 on each relay, and a full pick-up winding indicated by the lead wires 126 and 127 on each relay.

When the transistor amplifier 103 associated with an appropriate relay 0X transmits a signal thereto, the relay 0X is preliminarily energized by way of the preliminary winding circuit consisting of the wires 124 and 125 and thence to a closed contact member 126a of readout relay 46 (energized by circuitry completed by action of timer device 2 as explained hereinafter with discussion of FIG. 8) and then to ground via wire 127.

The circuit for energizing the preliminary windings of the relays 1X through 9X includes the lead wires 124 and 125 thereof and common return wires 128 and 129 to a contact member 130 of the readout relay 46 (explained hereinafter) and then to ground via wire 131. It should be noted that, as will be explained hereinafter, the transistor amplifier 103 connected to the zero target of the beam tube 10 has a separate added function during counting operations, and, therefore, the associated relay 0X is not connected to the common return wire 128 (to which the other transistor amplifiers and relays are connected) in order to prevent any undesired completion of a possible back circuitry feeding back through any one of the relays 1X through 9X during counting but must be connected to a separate ground connection as just described. On each of the relays 0X through 9X, when the preliminary windings thereof are selectively energized during readout by circuitry just described, a preliminary contact member 132 associated with each relay will close to complete the circuitry for energizing the full pick-up winding including the wires 126 and 127 on each relay, all of which are connected to a common return wire 133 and a common supply wire 134, which, in turn, are connected via a normally closed contact member 135 of the reset relay 45 energized by circuitry completed by action of the time device, as explained hereinafter with discussion of FIG. 8, to a suitable source of electrical energy indicated herein as B+ to thereby selectively (in accordance with the selected transistor amplifier then conducting) cause one of said relays 0X through 9X to be energized to a full pick-up condition to close a plurality of logic contact members, described hereinafter in the description of logic circuitry, to perform different readout functions.

Each time the zero target of the beam tube 10 is energized to energized the associated transistor amplifier 103, a separate signal is supplied to the wire 136 leading from the wire 124 connected to the emitter thereof, said signal being supplied by wire 136 to the third flip-flop amplifier 13 which includes transistors 137 and 138 and the usual plurality of resistors (not described) connected in a manner well known to provide flip-flop amplifier circuitry, such that when transistor 137 is conducting, a signal is transmitted by way of wire 139 to the even grids (not shown) of the third beam tube 14, and when the transistor 138 is conducting, a signal is transmitted by way of wire 140 to the odd grids (not shown) of the third beam tube 14. In that the signal thus supplied to the third flip-flop amplifier 13 is not in a wave form, a "steering circuit" (similar to that described as associated with the second flip-flop amplifier 9) comprising a plurality of condensers 141 and 142, rectifiers 143 and 144, and resistors 145 and 146 is included in the amplifier circuitry to permit the unipolar positive potential pulse signal supplied thereto to operate the flip-flop amplifier 13 in the usual manner. The flip-flop amplifier 13 is powered by circuitry including wire 80 from the B+ wire 56 and wire 81 to the amplifier 13, and thence through the internal circuitry thereof to the ground wire 147.

With the third beam tube 14 powered from the B+ wire 56 by way of wires 80 and 81 and thence through the tube 10 to the ground wire 148, the tube is operable responsively to each pulse supplied successively to the grids thereof by the flip-flop amplifier 13 to effect energization of successive targets (not shown but identified by indicator numerals 0 through 9) one at a time in correspondence with each successive pulse. Each target 0 through 9 of beam tube 14 is connected by a respective wire 149, 150, 151, 152, 153, 154, 155, 156, 157 and 158 through individual coupling resistors 159, 160, 161, 162, 163, 164, 165, 166, 167 and 168 to supply a signal to cause operation individually of respective transistor amplifiers 169, 170, 171, 172, 173, 174, 175, 176, 177 and 178. Each of the transistor amplifiers 169 through 178, upon receipt of its respective input signal from its respective target, is powered by a circuit including the B+ wire 56, wire 113, and thence to each of the respective transistor amplifiers in parallel. Associated with each of the transistor amplifiers 169 through 178 and operably energized when their respective amplifiers are conducting and supplying a signal via a wire 179 similarly at each amplifier, are a plurality of identical relays 0C, 1C, 2C 3C, 4C, 5C, 6C, 7C, 8C and 9C for each amplifier 169 through 178, respectively. The relays 0C through 9C are identified as such in that the numeral represents the number of the target of the beam tube 14 which effects eventual energization of the corresponding relay, and the letter C indicates that the relay is utilized as a counter of hundreds when energized, as explained hereinafter. The identical relays 0C through 9C each are provided with a preliminary pick-up winding indicated by the lead wires 179 and 190 similarly for each relay, and a full pick-up winding indicated by the wires 191 and 192 for each relay.

Circuitry for preliminary energization of relay 9C (responsively to a signal from amplifier 178) includes connected lead wires 179 and 190, closed contact member 196 of the readout relay 46 (closed during readout, as explained hereinafter) and ground wire 197 to thereby effect closure of the preliminary contact member 195 thereof.

Circuitry for preliminary energization of relays 0C through 8C (responsively to a signal from respective associated transistor amplifiers 170 through 177) includes lead wires 179 and 190 connected at each relay and connected to a common return wire 198, thence to wire 199 connected to the closed contact member 200 of the readout relay 46 (closed during readout, as explained hereinafter) and ground wire 201 to thereby effect closure of the preliminary contact member 195 of the individual relay so energized.

It should be noted that relay 9C has separate added circuitry in parallel therewith to perform an additional separate function (explained hereinafter), and therefore in order to prevent any undesired completion of possible back circuitry feeding back through one of the relays 1C through 8C during the performance of these functions, this relay has a separate ground connection through a contact 196 of the readout relay 46, as just described.

Closure of the preliminary contact member 195 on any individual one of the relays 0C through 9C effects completion of circuitry for energization of the full pick-up winding (not shown) indicated by the wires 191 and 192 connected to each relay from the common return wire 133 and common supply wire 134, to thereby selectively (in accordance with the selected transistor amplifier then conducting) cause one of the relays 0C through 9C to be energized to a full pick-up condition during readout, to close a plurality of contact members, described hereinafter in the description of the logic circuitry, to perform different selected functions during readout.

Summarizing the counting operation thus far described, it can be seen that upon receipt of wayside signals indicating the desired speed at that location, the timing device 2 is conditioned such that the signal from the frequency generator is supplied therethrough only for a time interval determined by the cam operated timing contacts of said timing device. This signal is amplified by the amplifier 5 and utilized to effect operation of the flip-flop amplifier 6. The flip-flop amplifier 6 transmits a signal of double frequency of its input signal to a beam tube 7 to count the fresuency peaks of the signal, thus, the beam tube connector 7, counting every peak, becomes a *unit* counter. On every tenth count, the beam tube 7 operates an amplifier 8 to transmit a unipolar signal to the flip-flop amplifier 9 where a steering circuit causes said unipolar signal to operate the flip-flop amplifier 9 to transmit a signal to a beam tube 10, responsively to each signal received, thus the beam tube counter 10 becomes a *ten unit* counter. Every signal count on the beam tube 10 operates a successively different amplifier 103 through 112 to condition the preliminary winding of the individually associated relays 0X through 9X to be energized when the circuitry thereof is completed by closure of the contact members 126 and 130 of readout relay, as will be explained. Every tenth count (0 target) on the beam tube 10 also operates the amplifier 103 to transmit a unipolar signal to the flip-flop amplifier 13 where a steering circuit causes said unipolar signal to operate the flip-flop amplifier 13 to transmit a signal to the beam tube 14, responsively to each signal received, thus, the beam tube 14 becomes a ten unit counter of every tenth count received from the ten unit counter beam tube 10, or, in effect, a *hundred unit* counter. Every signal count on the beam tube 14 operates a successively different amplifier 169 through 178 to the preliminary winding of the individually associated relays 0C through 9C. This counting operation continues during the prescribed time interval allotted by the cam 31 operating the selected timing contact. When the allotted time interval ends, the selected cam 31 opens the selected one of timing contacts 34 through 37 to stop the counting phase of operation, just described, and closes the timing contact 33 which, in turn, effects energization of the readout relay 46 from the source 44 (FIG. 2), wire 202, closed contact 33, and wire 203 to the readout relay 46 (FIG. 8), and then to ground wire 204. With the counting phase stopped as just described, the stepping operation of the beam tubes 7, 10 and 14 stops but the respective beam tubes 10 and 14 remain energized on the target at which they were on at the time of stopping, thereby each energizing only one particular transistor amplifier and associated relay corresponding to the signal count at the end of the counting phase. With the readout relay 46 (FIG. 8) energized, the contact members 126a and 130 (FIG. 2), 196 and 200 (FIG. 3) close to initiate the readout phase of operation now described.

With the contact members 126a, and 130, 196 and 200 of relay 46 closed as just described, the ground wire circuitry is completed enabling energization of the preliminary windings of the relays 0X to 9X and 0C to 9C. Thus, at the time the said readout relay contacts closed, energization of one preliminary winding in the 0X to 9X bank of relays and (unless the count is under 100) one in the 0C to 9C bank of relays will occur in accordance with whichever one of each bank of said relays that was subject to a signal from the particular targets of the beam tubes 10 and 14 at that particular time. For purposes of description, let it be assumed that at the time the readout relay 46 was picked up, the number 5 target of the beam tube 10 was energized, and the number 4 target of the beam tube 14 was energized. Such being the case, only the preliminary windings of the 5X and the 4C relays will be energized. With energization of the two selected preliminary windings, the respective preliminary contact members 132 and 195 are closed to energize the respective full pick-up windings of the said relays from the battery source (indicated in FIG. 2 as B— and B+) by way of the normally closed contact member 135 of the reset relay 45 (FIG. 9) connected by wires 134, 205 and 133. Energization of the aforesaid relays by the full pick-up windings effects closure of all the contact members of only the respective picked-up relays in the logic circuitry. In this case, as previously assumed, with the 5X and 4C relays picked up, giving a count of five "ten" units and four "hundred" units or 450 cycles, each contact member 5X–1, 5X–2, 5X–3, 5X–4, 5X–5 and 5X–6 (FIGS. 4 and 5) of the 5X relay is picked up and closed, and each contact member 4C–1, 4C–2, 4C–3, 4C–4, 4C–5, 4C–6 and 4C–7 (FIGS. 4 and 5) of the 4C relay is picked up and closed. Similarly, if the speed of the train is such that the frequency count of pulses supplied by the frequency generator 4 during the measured time interval is any other count when the preselected timing contacts open and the readout relay 46 is energized, a different speed count occurs to cause a different combination of the relays 0X to 9X and relay 0C to 9C to be energized and picked up, thereby picking up correspondingly different sets of contact members in the logic circuitry. As can be seen by the coded identifying numerals, if relay 0X is energized and picked up, the contact members 0X–1, 0X–2 through 0X–6 are closed, or if the 0C relay is energized and picked up, the contacts members 0C–1 through 0C–2 are closed, and similarly with any other combination of picked-up relays.

For simplicity of description, not all combinations of closed contact members in the logic circuitry are quoted herein, however, the plurality of contact members for each of the relays 0X through 9X and 0C through 9C can be readily identified on the drawings by the corresponding coded reference numerals.

Included in the logic circuitry are the contact members of the zone relays 19 and 19a. In that zone relay 19 is utilized in one speed zone, the contact members thereof are identified by Z1–1, Z1–2, Z1–3 through Z1–7. Similarly, the contact members fo zone relay 19a utilized in a second speed zone are identified by Z2–1 through Z2–7. The zone relays 19 and 19a are wayside operated simultaneously and cooperatively with the wayside pick-up device 1 (FIG. 2) such that in a particular speed zone, the pick-up device 1 selects the particular zone coding contacts 38 through 43 to thereby select the particular cam operated timer contacts 34 through 37 to set the time of counting, and, simultaneously, the zone relays 19 and 19a select the desired set of contact members Z1–1 through Z1–7 and Z2–1 through Z2–7 to thereby preselect the desired circuitry for that particular speed zone in a manner that the actual speed count effecting pick-up of the contact member 0X–1, 1X–1, etc. can complete only one logic circuit to effect the desired brake or propulsion control. The zone relay 19 is utilized, for example, in the 15, 25 or 30 m.p.h. zones with the speed count being selected by the cam operated timer contacts to be in the 300 to 500 c.p.s. range, and the zone relay 19a is utilized in the 20, 35 and 40 m.p.h. zones with the speed count being selected by the cam operated timer contacts 34 through 37 to be in the 500 to 700 c.p.s. range Using, for example, the previously assumed conditions, that is, the train is passing through a zone where a speed of 30 m.p.h. is desired and the actual speed count by the beam tubes at readout is 450 c.p.s. When the train enters the speed zone, wayside signals condition the coding contact 39 (the 30 m.p.h. contact) to close, to guide the incoming signal from the generator 4 to the timing contact 37 which is closed for a measured counting time interval by cam 31. Simultaneously, the zone relay 19 (30 m.p.h. relay) closes the contacts Z1–1, Z1–2, Z1–3, Z1–4, Z1–5, Z1–6 and Z1–7 to thus condition the logic circuitry for 30 m.p.h. circuitry. While the timing contact 37 is closed the predetermined measured time, the beam tubes 10 are recording the frequency count of the speed signal and advancing the energiaztion of their respective targets and associated transistor amplifiers. At the end of the counting cycle, the cam 31 causes the timing contact to open to stop the counting, and the cam 31 also closes the timing contact 33 to energize the readout relay 46 and initiate the readout cycle. As assumed previously, at the end of the counting cycle the 5X and 4C relays are energized giving an actual speed count of 450 c.p.s. and closing all of the 5X and 4C contact members in the logic circuit. It can now be seen that the only logic circuit that can be completed must include a 5X contact member, a 4C contact member, and a Z1 contact member. Viewing FIGS. 4 and 5, it can be seen that this described combination of contact members is found in FIG. 5 only, utilizing the 5X–3 contact member, the 4C–4 contact member and the Z1–4 contact member, thereby completing circuitry for energizing the brake control relay 23. Circuitry for energizing the brake control relay 23 includes a source of electrical energy shown in FIG. 5 as battery 206, a common B+ wire 207, lead wire 208 to the contact member 5X–3, wire 209 and 210 to contact member 4C–4, wire 211 to contact member Z1–4, wire 212, wire 213 to a normally closed contact member of an overspeed relay described hereinafter, and wire 214 to the brake control relay 23 and thence to ground wire 215.

It can thus be seen that responsively to different wayside signals selecting different timing contacts and energizing different zoning relays, and different train speeds effecting energization of different relays 0X through 9X and 0C through 9C, a different logic circuit utilizing different combinations of the associated contact members can be established for all speed requirements to energize a different one of the brake control relays 20 through 27 (described hereinafter) selectively in accordance with wayside signal requirements and speed conditions. In that each of these different logic circuits for different speed counts can be traced-out by use of the coded identifying numerals in FIGS. 4 and 5, detailed description of the complete circuits is not necessary herein. It should be noticed that the common B+ wire 207 connects the battery 206 of FIG. 4 to supply all logic circuitry on both FIGS. 4 and 5.

Each of the brake control relays 20 through 26 serves a different purpose when energized under prescribed conditions by the selected logic circuitry.

Brake control relay 21 (FIG. 4) is utilized as a preliminary dynamic brake control relay to establish the required circuitry on the traction motors on the locomotive represented herein in FIG. 7 as an armature 216 connected selectively to a source of electrical energy (B+) when operated as a motor during propulsion, or to a heat dissipating resistor 217 when operated as a generator during dynamic braking. A field coil 218 is conected selectively to different portions of a dynamic resistor 219 such that different degrees of energization of said coil is effected when supplied with energy (B+) as explained hereinafter. For simplicity of description, brake control relay 21 is hereinafter referred to as the preliminary dynamic brake relay 21, or more simply the P.D. relay 21. Energization of the P.D. relay 21 by logic circuitry through either the Z2–2 or Z1–2 contact members (FIG. 5) as previously described causes the contact member 21a (FIG. 6) thereof to complete circuitry from the B+ wire 207 via a wire 220, the winding of a repeater relay 21R, wire 222, the normally closed contact member 20a of the deenergized brake control relay 20, wire 223, closed contact member 21a of the energized P.D. relay 21, wire 224, to wire 225 (FIG. 4) through the energized P.D. relay 21 to ground wire 226 to thereby form a stick circuit for maintaining the P.D. relay 21 energized even though the logic circuitry for energizing said P.D. relay 21 may be opened as during the "reset" cycle of operations explained hereinafter. It can thus be seen that once the P.D. relay is energized by its associated logic circuitry, the stick circuitry so completed by the initial energization thereof will maintain the P.D. relay 21 energized as long as the contact member 20a of brake control relay 20 is closed. Completion of this just-described stick circuitry for P.D. relay 21 also energizes the repeater relay 21R which, in turn, effects closure of all contact members 21Ra thereof (FIGS. 6, 7) and opening of all contact members 21Rb thereof (FIGS. 6, 7). Opening of the contact members 21Rb opens the motor circuitry including wires 227 and 228 (FIGS. 6, 7) to the armature 216 thereby stopping propulsion control by the traction motor of which said armature is an element thereof. Closing the contact members 21Ra connects the armature 216 by way of wires 229 and 230 to the heat dissipating resistor 217 and completes circuitry including wire 231 to the dynamic resistor 219 such that the field coil 218 may be excited by different degrees in accordance with closure of the contact members (described hereinafter) associated with the resistor 219, thereby establishing preliminary dynamic brake circuitry in the usual well-known manner. Due to residual magnetism in the field coil 218, a small degree of dynamic braking will occur, however, substantial dynamic braking does not occur until the different portions of the dynamic resistor 219 are included in the circuitry, as explained hereinafter.

Brake control relay 22 is utilized as a minimum dynamic brake control relay and is hereinafter referred to as the M.D. relay 22 for establishing circuitry for effecting a minimum dynamic braking effect when the M.D. relay 22 is energized by way of contact members Z1–3 or Z2–3 and associated logic circuitry. Energization of the M.D. relay 22 effects closure of the contact members 22a and 22b thereof (FIGS. 6, 7) to respectively establish a stick circuit for maintaining the M.D. relay 22 energized during a "reset" cycle operation, described hereinafter, and establishing circuitry including a large portion of the dynamic resistor 219 for energizing the field coil 218 a minimum degree to thereby effect minimum dynamic braking effect. The stick circuitry for the M.D. relay 22 includes B+ wire 207, a wire 232, closed contact member 25c of the brake control relay 25, wire 233, closed contact member 24c of the brake control relay 24, wire 234, closed contact member 23c of brake control relay 23, wire 235, closed contact member 20b of brake control relay 20, wire 236, closed contact member 22a of the just energized M.D. relay 22, wire 237 and wire 238 (FIG. 5) through the winding of the M.D. relay 22 to the ground wire 239, to thereby maintain the M.D. relay 22 energized and picked up until one of the contact members 20b, 23c, 24c, or 25c are opened by energization of their associated relays, as explained hereinafter. Also with energization and pick-up of the M.D. relay 22, the contact member 22b thereof (FIGS. 6, 7) is closed between wires 240 and 241 to insert a large predetermined portion of the dynamic resistor 219 in series with the field coil 218 to thereby provide a minimum degree of dynamic braking effect. During reset operation, the just-described circuitry will be maintained by the stick circuitry just described for the M.D. relay 22 until another series of "counting" and "readout" occurs by the apparatus which reuslts in energization in the same logic circuitry being energized again as a result of no change in train speed or track requirements, or in a different logic circuitry being energized due to a change in train speed, as, for example, with an increase in speed to increase the count in the logic circuitry to effect energization of the brake control relay 23.

Brake control relay 23 is utilized to effect dynamic braking of ⅓ maximum effective dynamic braking and is referred to hereinafter as the ⅓D relay 23. Energization of the ⅓D relay 23 by way of contact members Z1–4 or Z2–4 and associated logic circuitry effects closure of the contact members 23a and 23b thereof to establish respectively a stick circuit for maintaining the ⅓D relay energized during a reset cycle after said relay has been picked-up, and a dynamic braking circuit including a portion of the dynamic resistor 219 for energizing the field coil 218 to a degree to effect ⅓ maximum dynamic braking. Energization of the ⅓D relay 23 also causes opening of the normally closed contact member 23c thereof to open the previously described stick circuit for M.D. relay 22, thereby causing deenergization and dropout of the M.D. relay 22 when ⅓D relay 23 is picked-up. Thus, the contact member 22b in the dynamic circuitry is opened and contact 22c in the stick circuit for ⅓D relay 23 is closed. The stick circuitry for the ⅓D relay 23 includes the B+ wire 207, wire 242, closed contact member 25d or brake control relay 25, wire 243, closed contact member 24d of brake control relay 24, wire 244, normally closed contact member 22c of M.D. relay 22 (which has now been deenergized and dropped as just explained to permit closure of contact member 22c), wire 245, normally closed contact member 20c of brake control relay 20, wire 246, closed contact member 23a of the now energized ⅓D relay 23, wire 247, and wire 214 (FIG. 5) through the winding of the ⅓D relay 23 to the ground wire 215. The closing of the contact member 23b between wires 248 and 249 (FIGS. 6, 7) inserts a portion of the dynamic resistor 219 in series with the field coil 218, said portion being of predetermined amount to effect dynamic braking of ⅓ maximum degree. During reset operation described hereinafter, the ⅓ dynamic braking remains effective due to the stick circuit for the ⅓D relay 23. The subsequent readout operation after reset and following the next count operation may result in the same logic circuitry being energized to parallel the energizing stick circuitry for ⅓D relay 23, or effect energization of different logic circuitry as a result of a change in train speed effecting a different count or transition of the train into a different track zone having different wayside signals, thereby effecting energization of different brake control relays.

It should be noted that each of the brake control relays 21 through 26 has its own stick circuit to maintain the respective relay energized until selection of different logic circuitry effects energization of a different brake control relay, thereby opening the stick circuit for the relay previously energized which, in turn, effects completion of the stick circuitry for the newly selected relay in cooperation with a contact member of each of the brake control relays 21 through 26 as can be seen with the following circuit descriptions.

Brake control relay 24 is utilized to effect dynamic braking of ⅔ maximum effective dynamic brake and is, therefore, hereinafter referred to as the ⅔D relay 24. Energization of ⅔D relay 24 by way of contact members Z1–5 or Z2–5 and associated logic circuitry effects closure of the contact members 24a and 24b, to respectively establish a stick circuit and a ⅔ maximum dynamic braking circuit, and also effects opening of contact members 24c, 24d and 24e to open stick circuits for other brake control relays.

The stick circuit for ⅔D relay 24 includes the B+ wire 207, wire 250, normally closed contact member 25e of brake control relay 25, wire 251, normally closed contact member 23d of the ⅓D relay 23, wire 252, normally closed contact member 22d of M.D. relay 22, wire 253, normally closed contact member 20d of brake control relay 20, wire 254, now closed contact member 24a of now energized ⅔D relay 24, wire 255 and wire 256 (FIG. 5) through the winding of ⅔D relay 24 to ground wire 257. Closure of contact member 24b between wires 258 and 259 (FIGS. 6, 7) inserts a portion of the dynamic resistor 219 in series with the field coil 218, said portion being of predetermined amount to effect dynamic braking of ⅔ maximum degree.

Brake control relay 25 is utilized to effect a maximum or full dynamic braking and is therefore hereinafter referred to as the FD relay 25. Energization of the FD relay 25 by way of contact members Z1–6 or Z2–6 and associated logic circuitry effects closure of the contact members 25a and 25b (FIGS. 6, 7) for respectively establishing a stick circuit for said relay 25 and the full dynamic braking circuit, and also effects opening of contact members 25c, 25d and 25e (FIGS. 6, 7) to open the stick circuits for the MD relay 22, ⅓D relay 23 and ⅔D relay 24 to insure full dynamic braking.

The stick circuit for the FD relay 25 includes the B+ wire 207, wire 260, normally closed contact member 24e of ⅔D relay 24, wire 261, normally closed contact 23e of ⅓D relay 23, wire 262, normally closed contact 22e of MD relay 22, wire 263, normally closed contact member 20e of brake control relay 20, wire 264, now closed contact 25a of energized FD relay 25, wire 265 and wire 266 (FIG. 5) through the winding of the FD relay 25 to the ground wire 267. Closure of contact member 25b between wires 268 and 269 (FIGS. 6, 7) inserts only a small portion of the dynamic resistor 219 in series with the field coil 218 such as to bring about a maximum dynamic braking effect.

Brake control relay 26 is utilized to effect operation of the pneumatic braking equipment (FIG. 10) on the locomotive to result in a pneumatic braking at a minimum service reduction rate and is therefore hereinafter referred to as the PB relay 26. Energization of the PB relay 26 by way of contact members Z1–7 or Z2–7 and associated logic circuitry effects closure of the contact member 26a thereof (FIG. 6) to complete circuitry from the B+ wire 207, wire 270, normally closed contact member 20f of brake control relay 20, wire 271, now closed contact 26a of PB relay 26, and wire 272 to the winding of a solenoid valve 273 of the pneumatic equipment (FIGS. 10, 11) and thence to ground wire 274 to thereby effect a minimum pneumatic braking, as briefly described hereinafter. It should be noted that the energization of the PB relay 26 did not open any of the stick circuitry for the other brake control relays, therefore, any degree of dynamic braking effective when the PB relay 26 is energized remains effective to supplement the pneumatic braking so effected by PB relay 26.

The pneumatic equipment (FIG. 10) utilized herein may be of any well-known type employing a bake valve 275, a control valve 276, a main reservoir 277, a brake cylinder 278, a relay valve 279 operated under control of the control valve 276 to effect supply and delivery of fluid under pressure from the main reservoir 277 to the brake cylinder responsively to the usual well-known operation of the vent valve portion 280 of the brake valve 275. In the usual well-known manner, operation of the brake valve 275 to vent fluid under pressure from the equalizing reservoir 281 causes usual operation of the vent valve portion 280 thereof to control operation of the control valve 276 to, in turn, operate the relay valve 279 to supply fluid under pressure from the main reservoir 277 to the brake cylinder 278 to achieve pneumatic braking. In automatic operation with the present automatic apparatus described herein, the venting of the equalizing reservoir 281 is not done manually by the positioning of brake valve handle 282, but is automatically done by the energizing of the solenoid valve 273 of a solenoid valve bank 283 including a plurality of other solenoid valves that may be used, if desired, for other braking controls, an understading of which is not necessary to an understanding of the present invention. When the winding of solenoid valve 273 is energized, a valve stem 284 therein is moved downward to permit fluid under pressure from the equalizing reservoir 281 to flow via pipe and passage 285 to a chamber 286 in the valve 273, past a valve seat 287 which is open when the stem 284 is down, to a chamber 288 and thence to a passage and pipe 289 to a volume reservoir 290 of premeasured size to effect a predetermined reduction of fluid under pressure in the equalizing reservoir 281. The reduction of fluid under pressure from equalizing reservoir 281 causes the vent valve portion 280 of the brake valve 275 to cause a similar reduction in the brake pipe 291 throughout the train to effect a minimum service reduction and a pneumatic brake application throughout the train. Deenergization of the solenoid valve 273 permits a spring 292 to return the valve stem 284 to its upper position whereby venting of the equalizing reservoir is prevented at the valve seat 287, and venting of the volume reservoir 290 through a choke 293 to chamber 288 past a valve seat 294 to a venting port 295 to thereby lap the pneumatic brakes.

Brake control relay 20 is utilized to release all braking, both dynamic and pneumatic, and is therefore hereinafter referred to as the BR relay 20. Energization of the BR relay 20 by way of contact members Z1–1 or Z2–1 and associated logic circuitry effects closure of 20g (FIG. 6) to energize the winding of release solenoid valve 296 from B+ wire 207 via wire 297, now closed contact member 20g, wire 298 to the winding of the solenoid valve 296 (FIGS. 10, 11) and thence to ground wire 299 to effect release of pneumatic brakes as explained hereinafter. Energization of BR relay 20 also opens the contacts 20a, 20b, 20c, 20d and 20e of the stick circuits (FIG. 6) for each of the relays 21, 22, 23, 24 and 25, respectively, thereby interrupting all dynamic brake circuitry, and with the opening of contact member 20a of the stick circuit for PD relay 23, the circuitry for the vehicle motors is changed from dynamic braking circuitry to propulsion operation circuitry by deenergization of repeater relay 21R to thus restore propulsion operation circuitry and propulsion control which may be varied by means, an understanding of which is not necessary to an understanding of the present invention and therefore not described herein.

Energization of the release solenoid valve 296, as just described, causes a valve stem 300 to move to its down position whereby fluid under pressure is supplied from a relay valve 301 normally supplied with fluid under pressure via a pipe and passage 302 to a chamber 303 of the solenoid valve 296, and thence past the opened valve seat 304 to a chamber 305, passage 306 to chamber 286 of the now deenergized solenoid valve 273, to the pipe and passage 285 leading to the equalizing reservoir 281 to thereby recharge the equalizing reservoir 281 to effect a release of pneumatic brakes in the usual well-known manner.

Having now described the individual function of each of the brake control relays 20 through 26 during readout phase responsively to energization of the respective associated logic circuits as determined by the counting operation previously described, it should be noted that the logic circuit so energized during readout remains energized only for a short time interval before reset operation begins, therefore explaining the necessity for the previously described stick circuits.

*Reset*

Continued operation of timer motor 3 operates the cams 31 to open the timing contact 33 to thereby deenergize the readout relay 46 to end the readout phase by opening the contact members 126a, 130, 196 and 200 thereof to interrupt the circuitry previously described for energizing the preliminary windings of all of the relays 0X through 9X and 0C through 9C such that any logic circuitry completed by energization of any one or pair of said relays is thereby opened. Simultaneously with the ending of the readout phase, the cams 31 operate to close the timing contact 32 which, in turn, effects energization of the reset relay 45 from the source 44 (FIG. 2), wire 202, closed contact 32 and wire 307 to the reset relay 45 (FIG. 9), and then to ground wire 308. With reset relay 45 energized, the contact member 135 (FIG. 2) is opened to interrupt the circuitry previously described for energizing all of the full pick-up windings for the relays 0X through 9X and 0C through 9C to thereby insure complete deenergization and drop-out of all of said relays. Energization of reset relay 45 also closes a plurality of contact members 309, 310, 311, 312, 313 and 314. Closing of contact members 309, 310 and 311 shorts out one side of each of the flip-flop amplifiers 6, 9 and 13 at wires 315–316, 317–318 and 319–320, respectively, to stop any operation thereof such that the counting phase previously described may start again when initiated by the timing motor 3 and cams 31 as initially described. Closing of contact members 312, 313 and 314 completes a short circuit within each of the beam tubes 7, 10 and 14 by wires 321–322, 323–324, and 325–326, respectively, to stop any operation thereof and return each of said beam tubes to their zero state (wherein the next target to be energized on each of said tubes is the zero target) in a manner well known by those familiar with these tubes, an understanding of which is not necessary for an understanding of the present invention.

It can thus be seen that the reset phase of operation merely restores all the components to their initial state such that another cycle of count and readout can be started immediately dependent on the timing cams 31 to give a continuous speed check. Thus, a continuous repeating cycle of count, readout and reset is set up with each count dependent on on the actual speed of the train, and each readout being dependent on the track requirements and train speed count during that particular cycle. During reset, the brake control relays 21 through 25 are maintained operatively effective until the next readout phase by the described stick circuits.

*Overspeed*

During count and readout phase of operation, should the speed of the train be of such a high undesired degree as to cause the 9C relay to be energized indicating a count of 900 which is considered to be an overspeed condition of the train, a parallel overspeed circuit is established. The overspeed circuit in parallel with the 9C relay includes a wire 327 to a preliminary winding of overspeed relay 328 and ground wire 329 to thereby close stick circuit contact member 328a thereof to maintain said relay energized and picked-up by way of B+ wire 81, wire 330, full pick-up winding of relay 328, wire 331, now closed contact member 328a, and wire 332 to the wire 113 going to ground (FIG. 2). It should be noted that once the contact member 328a has been closed, it can only be opened manually, since the circuit just described connects the full pick-up winding of relay 328 directly between a B+ connection and a ground connection just described. With overspeed relay 328 picked-up, the normally closed contact members 328b, 328c, 328d, 328e, 328f, 328g and 328h each respectively in series with brake control relays 20 through 26 in their respective logic circuits (FIGS. 4 and 5) are now open to intercept all logic circuitry. Simultaneously, contact member 328i of relay 328 is closed, thereby paralleling the logic circuitry for the PB relay 26 by way of wires 333 and 334 to energize and pick up the PB relay 26 to thereby apply pneumatic braking in a manner described hereinbefore. In that such overspeed would be obviously caused only by something defective to bring the train to a stop and can only be released by manually opening the contact member 328a after any defect in the controls has been corrected.

Having now described the invention, what I claim as new and desire to secure by Letters Patent, is:

1. Automatic brake and propulsion control apparatus for unmanned trains, said apparatus comprising in combination:
   (a) signal pick-up means subject to influences propagated from the trackway and variously responsive depending upon the track zone entered by the train,
   (b) a plurality of brake control means selectively operative to effect different degrees of a brake application,
   (c) propulsion control means,
   (d) pulsating voltage means providing a voltage pulsating at a frequency proportional to the speed of the train,
   (e) pulsation counting means operative to count and to register the pulsation frequency of the voltage supplied by said pulsating voltage means,
   (f) timing means for establishing the time interval during which the pulsation counting means counts and registers the pulsation frequency of the voltage supplied by the pulsating voltage means,
   (g) and zoning means selectively responsive to control by said signal pick-up means according to the track zone entered by the train for selectively causing the timing means to vary the length of time said pulsation counting means counts the pulsation frequency of the voltage supplied by the pulsating voltage means,
   (h) said pulsation counting means and said zoning means being operative cooperatively to selectively control said plurality of brake control means and said propulsion control means to control the speed of the train according to the track zone entered by the train, 2. Automatic brake and propulsion control apparatus as claimed in claim 1, further characterized in that said timing means operates to establish sequentially one time interval during which the pulsation counting means counts the pulsation frequency and another time interval during which the pulsation counting means registers the pulsation frequency of the voltage supplied by the pulsating voltage means.

3. Automatic brake and propulsion control apparatus as claimed in claim 1, further characterized in that said timing means comprises:
 (a) motor means operated at a constant speed,
 (b) a series of variously contoured cams rotated by said motor means, and
 (c) a series of contactor means operated respectively by said cams for establishing counting circuitry during a first time interval according to the contour of the corresponding cams in which said pulsation counting means counts the frequency of pulsation of the voltage supplied by said pulsating voltage means and for subsequently establishing registration circuitry which registers said count during another time interval according to the contour of the corresponding cams.

4. Automatic brake and propulsion control apparatus as claimed in claim 1, further characterized in that said pulsating voltage means includes:
 (a) a source of alternating current voltage for supplying voltage at a cyclic frequency proportional to the speed of the train, and
 (b) voltage modifying means operably responsive to said alternating current voltage for amplifying said voltage and converting said voltage from a bipolar cyclic voltage to a unipolar voltage pulsating at a frequency which is a multiple of the bipolar cyclic voltage frequency and which is also proportional to the speed of the train.

5. Automatic brake and propulsion control apparatus as claimed in claim 4 further characterized in that said voltage modifying means includes:
 (a) a first amplifying means operably responsive to said alternating current voltage for effecting supply of an amplified and modulated alternating current voltage at a cyclic frequency proportional to the speed of the train, and
 (b) a second amplifying means operably responsive to the said amplified and modulated alternating current voltage to effect supply of a voltage amplified to another degree and pulsating at a frequency which is a multiple of the said cyclic frequency of said alternating current voltage, said frequency of pulsation being proportional to the speed of the train.

6. Automatic brake and propulsion control apparatus as claimed in claim 1, further characterized in that said pulsation counting means includes:
 (a) a plurality of ten-position counters operable responsively to the voltage supplied by said pulsating voltage means to sequentially count said pulsation frequency in units, tens and hundreds digits, respectively,
 (b) a plurality of switching amplifier means operable responsively to each ten count of the units ten-position counter to cause the tens ten-position counter to advance one position, and operable responsively to each ten count of the tens ten-position counter to cause the hundreds ten-position counter to advance one position, and
 (c) plurality of relay means operable responsively to each different count of the tens ten-position counter and hundreds ten-position counter to selectively effect control of said plurality of brake control means and said propulsion control means.

7. Automatic brake and propulsion control apparatus as claimed in claim 1, further characterized in that said zoning means is additionally responsive to control by said pick-up means according to the track zone entered by the train for selectively causing the establishment of different circuitry in cooperation with said pulsation counting means to selectively control said plurality of brake control means to effect different degrees of a brake application according to the track zone entered.

8. Automatic brake and propulsion control apparatus for unmanned trains, said apparatus comprising in combination:
 (a) pneumatic braking means,
 (b) dynamic braking means,
 (c) propulsion control means,
 (d) a plurality of control relay means selectively operative to effect propulsion control by said propulsion control means, and to effect a certain degree of pneumatic braking application by said pneumatic braking means and selected different degrees of dynamic braking application by said dynamic braking means,
 (e) signal pick-up means subject to influences propagated from the trackway and variously responsive depending upon the track zone entered by the train,
 (f) pulsating voltage means providing a voltage pulsating at a frequency proportional to the speed of the train,
 (g) pulsation counting means operative to count and to register the pulsation frequency of the voltage supplied by said pulsating voltage means,
 (h) timing means for establishing the time interval during which the pulsation counting means counts and registers the pulsation frequency of the voltage supplied by the pulsating voltage means,
 (i) zoning means selectively responsive to control by said signal pick-up means according to the track zone entered by the train for selectively causing the timing means to vary the length of time said pulsation counting means counts the pulsation frequency of the voltage supplied by the pulsating voltage means, and
 (j) said pulsating counting means and said zoning means being operative cooperatively to selectively cause said plurality of control relay means to control the said propulsion control means, said pneumatic braking means and said dynamic braking means in a manner to determine the speed of the train according to the track zone entered by the train.

9. Automatic brake and propulsion control apparatus as claimed in claim 1, further characterized by overspeed relay means operative responsively to operation of said pulsating counting means when said pulsating counting means counts and registers a high pulsation count indicative of a speed exceeding a certain high speed, to cause opreation of certain of said brake control means to effect a brake application adequate to stop the train regardless of the track zone entered by the train.

10. Automatic brake and propulsion control apparatus as claimed in claim 6, further characterized by overspeed relay means operative responsively to the count of a certain one of said hundreds ten-position counters indicative of a speed exceeding a certain high speed to cause operation of said plurality of brake control means to effect a brake application adequate to stop the train regardless of the track zone entered by the train.

11. Automatic brake and propulsion control apparatus for unmanned trains, said apparatus comprising in combination:
 (a) signal pick-up means subject to influences propagated from the trackway and variously responsive depending upon the track zone entered by the train,
 (b) a plurality of brake control means selectively operative to effect different degrees of a brake application,
 (c) propulsion control means,
 (d) pulsating voltage means providing a voltage pulsating at a frequency proportional to the speed of the train, (e) counting circuitry adapted to be selectively energized by said pulsating voltage at a selected one of a plurality of first predetermined time intervals for counting the pulsation frequency of said voltage,
(f) registry circuitry selectively energized responsively to selective energization of said counting circuitry at a second predetermined time interval for registering said count of the pulsation frequency of said voltage provided by said pulsating voltage means,
(g) timing means for selectively establishing the different selected time intervals of said first plurality of time intervals and sequentially the said second predetermined time interval during which said counting circuitry and said registry circuitry respectively are energized,
(h) zoning means selectively responsive to control by said signal pick-up means according to the track zone entered by the train for selectively causing said timing means to vary the length of the different selected first predetermined time intervals, and
(i) logic circuitry selectively energized responsively to cooperative energization of selected registry circuitry and said zoning means to selectively control said plurality of brake control means and said propulsion control means to control the speed of the train according to the track zone entered by the train.

12. The combination as set forth in claim 11 further including:
(a) reset circuitry energized responsively to control by said timing means at a third predetermined time interval for conditioning said counting circuitry and said registry circuitry respectively to count and register said pulsation frequency of said pulsating voltage.

References Cited by the Examiner
FOREIGN PATENTS
845,254   8/1960   Great Britain.

ARTHUR L. LA POINT, *Primary Examiner.*
S. T. KRAWCZEWICZ, *Assistant Examiner.*